(12) United States Patent
Damphier et al.

(10) Patent No.: US 7,418,006 B2
(45) Date of Patent: Aug. 26, 2008

(54) VIRTUAL ENDPOINTS

(75) Inventors: Jeffrey E. Damphier, Duvall, WA (US); Bradley J. Himelstein, Redmond, WA (US); Hilal R. Shaath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 11/075,070

(22) Filed: Mar. 8, 2005

(65) Prior Publication Data

US 2006/0203848 A1     Sep. 14, 2006

(51) Int. Cl.
    *H04J 3/16*     (2006.01)
(52) U.S. Cl. .................. 370/466; 370/386; 703/14; 703/20; 703/21; 709/224
(58) Field of Classification Search ........... 370/386, 370/466; 703/13–28; 709/223–225
    See application file for complete search history.

(56) References Cited

U.S. PATENT DOCUMENTS

| | | | |
|---|---|---|---|
| 5,440,719 A * | 8/1995 | Hanes et al. ............ | 703/21 |
| 5,946,474 A * | 8/1999 | Skogby .................. | 703/13 |
| 6,119,168 A * | 9/2000 | Hashimoto et al. ...... | 709/238 |
| 6,247,057 B1 | 6/2001 | Barrera, III | |
| 6,295,557 B1 * | 9/2001 | Foss et al. ............. | 709/224 |
| 6,324,492 B1 | 11/2001 | Rowe | |
| 6,408,335 B1 * | 6/2002 | Schwaller et al. ........ | 709/224 |
| 6,772,107 B1 * | 8/2004 | La Cascia et al. ........ | 703/21 |
| 7,239,994 B2 * | 7/2007 | Patiejunas .............. | 703/14 |
| 7,324,512 B2 * | 1/2008 | Larson et al. ........... | 370/389 |
| 2003/0053437 A1 | 3/2003 | Bahl et al. | |
| 2003/0054818 A1 | 3/2003 | Bahl et al. | |
| 2003/0101284 A1 | 5/2003 | Cabrera et al. | |
| 2004/0221298 A1 | 11/2004 | Cedola | |
| 2004/0223469 A1 | 11/2004 | Bahl et al. | |

* cited by examiner

*Primary Examiner*—Chi H. Pham
*Assistant Examiner*—Albert T Chou
(74) *Attorney, Agent, or Firm*—Woodcock Washburn LLP

(57) ABSTRACT

Disclosed is an architecture for automating testing tasks, which would otherwise have to be done manually using actual hardware, by providing the capability to dynamically create many types of networked computing devices with different network configurations, eliminating the need to have actual test machines physically networked. Virtual endpoints are virtual computing devices networked to virtual adapters on a real computer. The virtual endpoints architecture comprises a miniport driver, a filter engine, virtual networked computing devices, a virtual stack, and a user mode to kernel mode interface. The virtual endpoints architecture technology can be used to test bridge and Internet connection sharing features as well as for testing any NDIS driver or client/server application. The virtual endpoints architecture lowers the cost of testing and allows for the ability to run the aforementioned types of tests in a batch nodal stress suite and without the need for large test network topologies.

18 Claims, 3 Drawing Sheets

VIRTUAL ENDPOINTS

TECHNICAL FIELD

The present invention pertains to computer systems and computer system devices and, more particularly, to implementation of virtual computing devices networked to virtual network adapters.

BACKGROUND OF THE INVENTION

Conducting thorough testing of new hardware and software components is an essential step in developing and releasing products to market. To ensure that a particular component is compatible across as large of a user base as possible it needs to be tested with a wide variety of system configurations. However, maintaining such a large on-hand cache of various hardware and software components can prove to be a technically, financially, and administratively burdensome task. By reducing the number of actual hardware and software components to be maintained many advantages are realized, such as lower total lifecycle infrastructure costs and fewer required software licenses. Moreover, many environmental benefits can also be achieved, including hardware footprint reduction, power reduction, and reduced ambient cooling demands.

In the 1970's the concept of virtual machines was introduced in the VAX VMS environment. A virtual machine appears to be its own operating system running its own applications, but the virtual machine does not actually communicate with the hardware directly. Instead the virtual machine communicates to virtualized hardware and it is an underlying host operating system that actually handles the communication directly to the hardware. While virtual machine technology can be useful in testing software and hardware components and simulating an actual computer environment, virtual machine technology possesses some limitations which can hinder its use in software and hardware component testing. For example, the virtual machine will typically be constrained by the physical machine and hardware that the virtual machine is spooled up on. This can be particularly problematic, for instance, when a test scenario or multiple test scenarios may call for many different types of networking hardware infrastructures and configurations.

To date, traditional test strategies for testing client/server or network protocols have entailed setting up large lab configurations. Multiple processor architectures and platform skews are prevalent in today's typical test environments. Each of these test variants requires its own network setup. Network test configurations also require complex software to synchronize computers so that the test scenarios return accurate results. Further complicating matters, the hardware between the client and server can be faulty or interrupted (e.g., loss of power to the hub). Finally, with the increased prevalence of wireless networking technology, real world testing scenarios can require an even larger network topology that could potentially span the equivalent of several city blocks.

Accordingly, a need exists for a method or program that is able to dynamically create many types of virtual computers networked to a virtual network adapter, and, preferably can be implemented on both virtual and non-virtual machine platforms. The invention provides such an architecture. These and other advantages of the invention, as well as additional inventive features, will be apparent from the description of the invention provided herein.

SUMMARY OF THE INVENTION

In view of the foregoing, the present invention provides an architecture for automating testing tasks, which would otherwise have to be done manually using actual hardware, by providing the capability to dynamically create many types of networked computing devices with different network configurations, thus eliminating the need to have actual test machines physically networked. Virtual endpoints are virtual computing devices networked to virtual adapters on a real computer. In one embodiment the virtual endpoints architecture comprises a miniport driver, a filter engine, virtual networked computing devices, a virtual stack, and a user mode to kernel mode interface. The virtual endpoints architecture technology can be used to test bridge and Internet connection sharing (ICS) features as well as for testing any NDIS driver (intermediate and up) or client/server application. Not only does the virtual endpoints architecture lower the cost of testing but it also allows for the ability to run the aforementioned types of tests in a batch nodal stress suite and without the need for large test network topologies.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
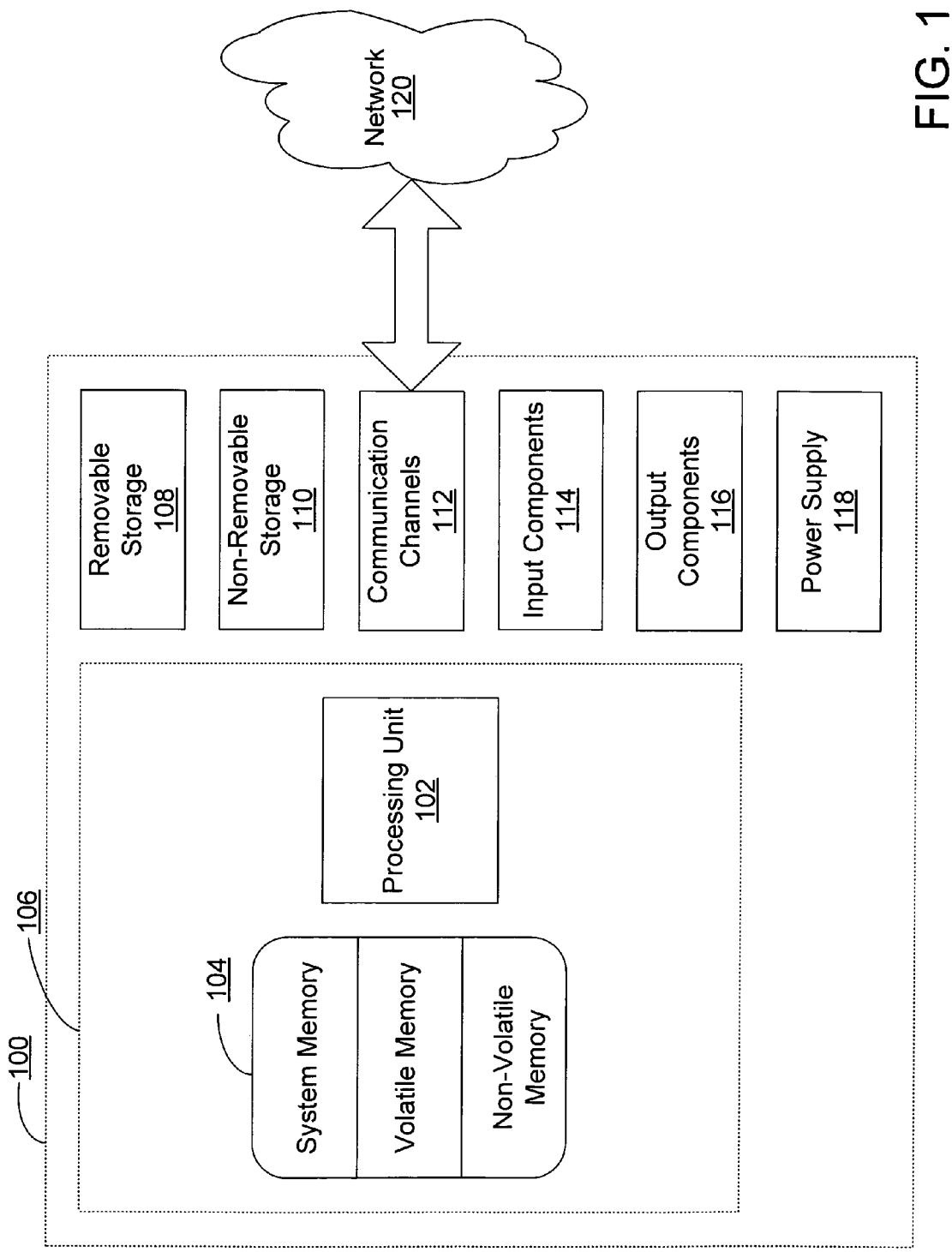
FIG. 1 is a schematic diagram of an exemplary computer architecture on which the virtual endpoints architecture of the present invention can be implemented.

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Referring to FIG. 1, in one embodiment the present invention relates to implementing an architecture which allows for the dynamic creation of many types of virtual network devices networked to virtual adapters on a physical computer. The computer can be a device that may have one of many different computer architectures. For descriptive purposes, FIG. 1 shows a schematic diagram of an exemplary architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Virtual Endpoints Architecture

The present invention is directed to implementing an architecture which allows for the dynamic creation of many types of virtual network devices networked to virtual adapters on a physical computer. For illustrative purposes only, the virtual endpoints architecture of the present invention is described as being implemented within the Microsoft Windows® operating system kernel, by Microsoft Corporation of Redmond, Wash. One of ordinary skill in the art will of course appreciate that the virtual endpoints architecture of the present invention can be implemented in another operating system kernel using the published standards.

To date, traditional test strategies for testing client/server or network protocols have entailed setting up large lab configurations. Multiple processor architectures and platform skews are prevalent in the typical test environments of today. Each of these test variants requires its own network setup. Network test configurations also require complex software to synchronize computers so that the test scenarios return accurate results. Further complicating matters, the hardware between the client and server can be faulty or interrupted (e.g., loss of power to the hub). Finally, with the increased prevalence of wireless networking technology, real world testing scenarios can require an even larger network topology that could potentially span the equivalent of several city blocks.

The present invention addresses the aforementioned shortcomings of the state of the art by providing an architecture for automating testing tasks, which would otherwise have to be done manually using actual hardware, by providing the capability to dynamically create many types of networked computing devices with different network configurations, thus eliminating the need to have actual test machines physically networked. Virtual endpoints are virtual computers networked to virtual adapters on a real computer. In one embodiment the virtual endpoints architecture comprises a miniport driver, a filter engine, virtual networked computers, a virtual stack, and a user mode to kernel mode interface. The virtual endpoints architecture technology can be used to test bridge and Internet connection sharing features as well as for testing any NDIS driver (intermediate and up) or client/server applications. Not only does the virtual endpoints architecture lower the cost of testing but it also allows for the ability to run the aforementioned types of tests in a batch nodal stress suite and without the need for large test network topologies.

Figure 2:
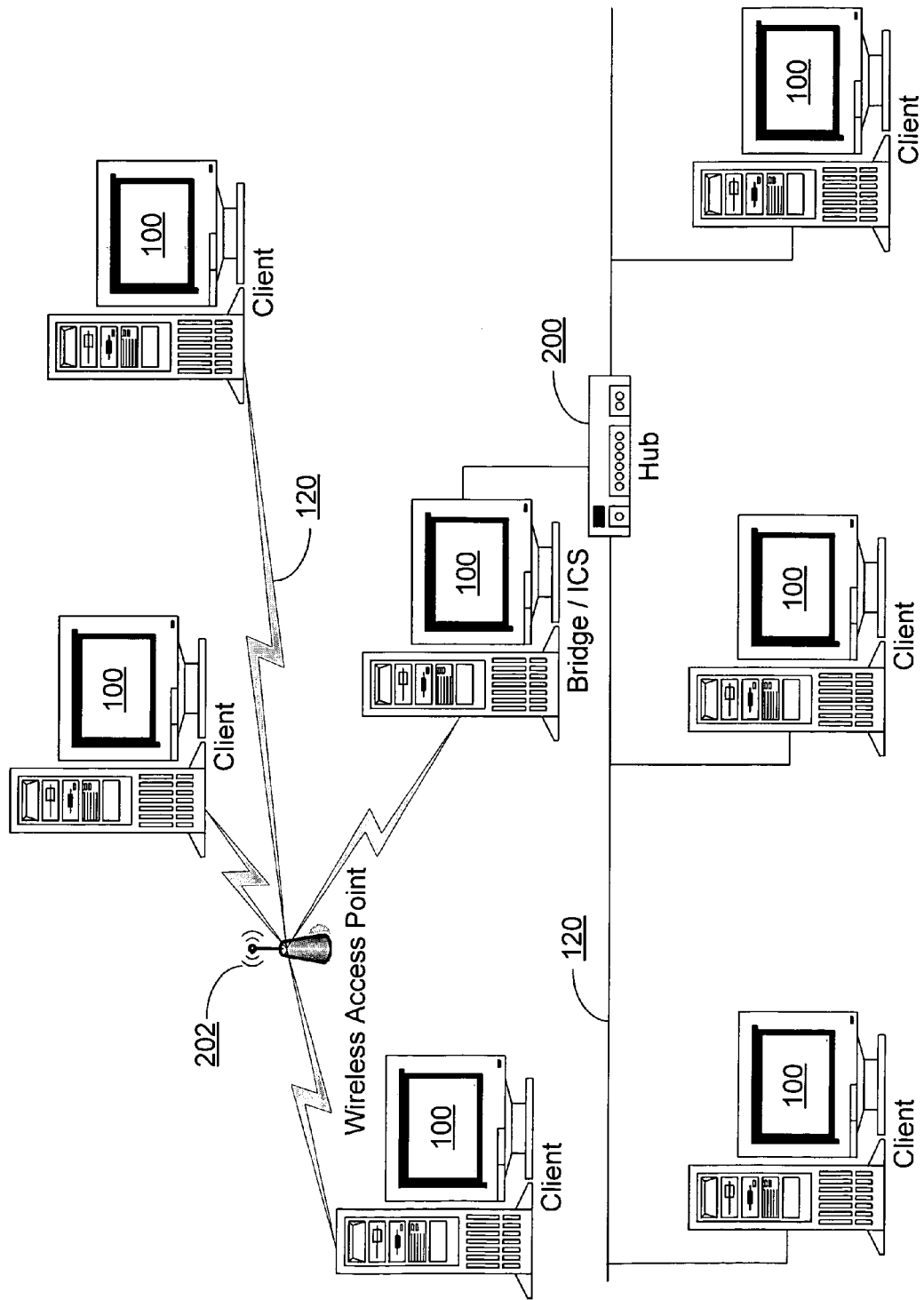
FIG. 2 is a schematic diagram showing an exemplary network infrastructure used for testing network functionality.

Turning to FIG. 2, an exemplary network infrastructure used for testing network functionality is illustrated. Here, the bridge/ICS computing device 100 is being tested for the network functionality of connecting the client computing devices 100 on the two networks 120 to each other or to a shared Internet connection. In the case of the present invention the virtual endpoints software would run on one computer, the bridge/ICS computer 100, and would not require any physical network interface cards. In this example the virtual endpoints architecture of the present invention would eliminate six computers 100, four Ethernet cards, four 802.11 wireless cards, one hub 200, and one wireless access point 202 from the test scenario leaving just the one computer 100 under test.

Figure 3:
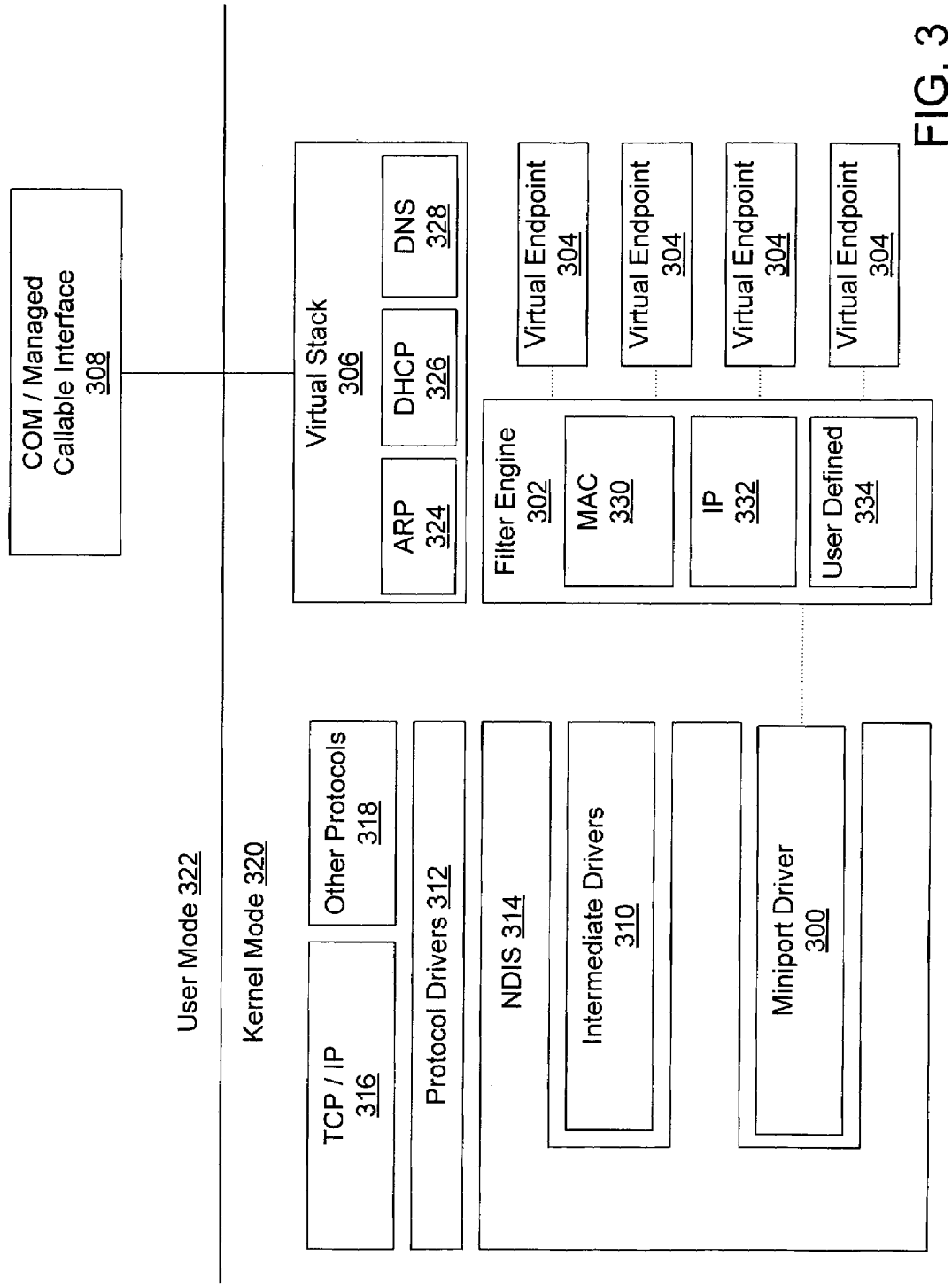
FIG. 3 is a schematic diagram showing the virtual endpoints architecture of the present invention.

With reference now to FIG. 3, in one embodiment the virtual endpoints architecture of the present invention is comprised of five components: a miniport driver 300, a filter engine 302, virtual endpoints (virtual networked computers) 304, a virtual stack 306, and a user mode to kernel mode interface 308. The miniport driver 300 directly manages a network interface card (NIC) and provides an interface to higher-level drivers. The intermediate drivers 310 provide interfaces between upper-level protocol drivers 312, such as a legacy transport driver, and the miniport driver 300. One of ordinary skill in the art will of course realize that a typical reason to develop an intermediate protocol driver 310 is to perform media translation between an existing legacy transport driver 312 and a miniport driver 300 that manages a NIC for a new media type unknown to the transport driver. The protocol drivers 312 are upper-level protocol drivers which implement a transport driver interface (TDI), or possibly an application-specific interface, at its upper edge to provide services to users of the network. At its lower edge, a protocol driver 312 provides a protocol interface to pass packets to and receive incoming packets from the next-lower driver. Another type of protocol driver 312 is a connection-oriented call manager. A call manager provides call setup and tear-down services for connection-oriented clients, which are also protocol drivers 312.

The miniport driver 300 allows for the creation of a wide range of virtual network adapters (NICs). These adapters act identical to real NIC drivers however they do not have any hardware attached to them. A single computer can install multiple virtual adapters, limited only by system resources. Each adapter can indicate a different medium type; for example two Ethernet adapters and three wireless adapters can be installed. The driver has the ability to support multiple medium types including, but not limited to, the following: 802.5 (Token Ring), Fiber Distributed Data Interface (FDDI), Infrared Data Association (IrDA), CoWan, IEEE 1394, native 802.11, and 802.3. Additionally, the driver has the ability to support multiple physical hardware types including, but not limited to, the following: wireless LAN, cable modem, telephone line, power line, Digital Subscriber Line (DSL), Fibre-channel, IEEE 1394, wireless WAN, native 802.11, and Bluetooth. Each adapter can then be configured through DeviceIoControl calls wrapped in the user mode interface 308. In addition to configuration setting, users can directly send and receive packets through the adapter using ReadFile and WriteFile operations. Additional tools can be used with the virtual adapter such as WINE (an open source implementation of the Windows® API on top of X and UNIX), network monitor, and Sparta.

The filter engine 302 filters out any unwanted packets that would normally be indicated to user mode applications. The filter engine 302 is also responsible for recognizing special packets. Special packets are packets that require additional handling. For example, if an ARP request is found the filter engine 302 checks each virtual endpoint 304 for the matching IP address. If a matching virtual endpoint 304 exists then the filter engine 302 uses the virtual stack 306 to create the corresponding ARP reply and indicate it to the NDIS stack. A motivation of the filter engine 302 is to lower the total number of ring zero to ring three transitions giving the driver better performance and throughput.

Virtual endpoints 304 are complex filters that represent computers on the virtual network. A virtual endpoint 304 has all of the main elements of a network computer or wireless access point, including a MAC address, an IP address and WINS/DNS/DHCP configurations. With respect to a wireless access point, the virtual endpoints of the present invention can include, but are not limited to, wireless access points that support both ad hoc and infrastructure modes and wireless security schemes such as Wired Equivalent Privacy (WEP), Temporal Key Integrity Protocol (TKIP), Wi-Fi Protected Access (WPA), and Wi-Fi Protected Access-Pre Shared Key WPA-PSK. A virtual endpoint 304 is added using DeviceIoControl codes. The driver handles creating the hardware MAC address and can optionally acquire DHCP, DNS, WINS, and AutoNet settings. User mode applications can then send and receive packets to and from the virtual endpoint 304 using WriteFile and ReadFile operations.

For sending packets the virtual stack 306 helps in creating lower layer protocol information based on the type of packet the user wants to send. If a user specifies a UDP layer packet the driver will be responsible for creating the needed MAC, IP, and UDP packet structure. When a packet is received the virtual stack 306 works with the filter engine 302 to generate any needed response packets, such as ARP responses.

The user mode interface 308 abstracts the difficult to use DeviceIoControl calls by providing easy to use object oriented interfaces. The interface can be called from COM, managed (C#), native (C lib), or scripting languages (Visual Basic Script). The user mode interface 308 also abstracts out the creation of packets and sessions and verifies the integrity of the packets after the driver 300 sends and receives them. In this respect the user mode interface 308 basically creates virtual traffic for the virtual endpoints 304. This layer supports multiple packet types including, but not limited to UDP, TCP, DHCP, ARP, and ICMP and also supports TCP sessions.

The virtual endpoints architecture also supports: high performance sends and receives (i.e., over 30 Gbps); adjustable data rates (user mode applications can adjust the delay between packets); buffered transmissions (allows for faster sending of packets by copying all of the packets up front); buffered reads (driver can hold packets in a receive queue to prevent the dropping of packets when the user mode application does not have enough read buffers available); user defined filters (block or allow packets based on a pattern match at a specified offset in the packet); and MUX driver implementation for Winsock based virtual endpoints.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for simulating a networked device on a computer system, the method comprising:
   providing a first interface, to manage a simulated network adapter, between the simulated network adapter and higher-level drivers;
   creating, with the first interface, the simulated network adapter on the computer;
   providing a second interface, to manage the simulated networked device, attached to the simulated network adapter, wherein the second interface facilitates communications between a user mode and a kernel mode;
   creating, with the second interface, the simulated networked device; and
   providing a filter engine and a virtual stack, wherein the virtual stack creates lower layer protocol information for sending packets from the simulated networked device and utilizes the filter engine to generate response packets when a packet is received by the simulated networked device.

2. The method of claim 1 wherein the first interface is a miniport driver.

3. The method of claim 1 wherein the simulated network adapter is a wired network adapter.

4. The method of claim 1 wherein the simulated network adapter is a wireless network adapter.

5. The method of claim 1 wherein the simulated networked device has a MAC address, an IP address, and a network configuration profile.

6. The method of claim 1 wherein the filter engine filters out unwanted packets that would normally be indicated to user mode applications and recognizes special packets.

7. A computer-readable medium having computer-executable instructions for performing a method for simulating a networked device on a computer system, the method comprising:

providing a first interface, to manage a simulated network adapter, between the simulated network adapter and higher-level drivers;

creating, with the first interface, the simulated network adapter on the computer;

providing a second interface, to manage the simulated networked device, attached to the simulated network adapter, wherein the second interface facilitates communications between a user mode and a kernel mode;

creating, with the second interface, the simulated networked device; and providing a filter engine and a virtual stack, wherein the virtual stack creates lower layer protocol information for sending packets from the simulated networked device and utilizes the filter engine to generate response packets when a packet is received by the simulated networked device.

8. The computer-readable medium of claim 7 wherein the first interface is a miniport driver.

9. The computer-readable medium of claim 7 wherein the simulated network adapter is a wired network adapter.

10. The computer-readable medium of claim 7 wherein the simulated network adapter is a wireless network adapter.

11. The computer-readable medium of claim 7 wherein the simulated networked device has a MAC address, an IP address, and a network configuration profile.

12. The computer-readable medium of claim 7 wherein the filter engine filters out unwanted packets that would normally be indicated to user mode applications and recognizes special packets.

13. A system configured to simulate a networked device, comprising, a network communications module, wherein the network communications module:

provides a first interface, to manage a simulated network adapter, between the simulated network adapter and higher-level drivers;

creates, with the first interface, the simulated network adapter on the system;

provides a second interface, to manage the simulated networked device, attached to the simulated network adapter, wherein the second interface facilitates communications between a user mode and a kernel mode;

creates, with the second interface, the simulated networked device; and provides a filter engine and a virtual stack, wherein the virtual stack creates lower layer protocol information for sending packets from the simulated networked device and utilizes the filter engine to generate response packets when a packet is received by the simulated networked device.

14. The system of claim 13 wherein the first interface is a miniport driver.

15. The system of claim 13 wherein the simulated network adapter is a wired network adapter.

16. The system of claim 13 wherein the simulated network adapter is a wireless network adapter.

17. The system of claim 13 wherein the simulated networked device has a MAC address, an IP address, and a network configuration profile.

18. The system of claim 13 wherein the filter engine filters out unwanted packets that would normally be indicated to user mode applications and recognizes special packets.

* * * * *